(12) United States Patent
Toledo et al.

(10) Patent No.: US 10,583,787 B1
(45) Date of Patent: Mar. 10, 2020

(54) VEHICLE RETAINER SOLUTION

(71) Applicant: Ford Global Technologies, LLC, Dearborn, MI (US)

(72) Inventors: Carlos Henrique Werneck de Toledo, Salvador (BR); Diego Freitas Araujo, Lauro de Freitas (BR); Julio Magalhaes, Salvador (BR)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 16/167,691

(22) Filed: Oct. 23, 2018

(51) Int. Cl.
| | | |
|---|---|---|
| *A47G 29/00* | (2006.01) |
| *B60R 11/00* | (2006.01) |
| *B60N 3/10* | (2006.01) |
| *B60N 2/90* | (2018.01) |
| *B60R 11/02* | (2006.01) |

(52) U.S. Cl.
CPC .............. *B60R 11/00* (2013.01); *B60N 2/90* (2018.02); *B60N 3/103* (2013.01); *B60R 11/02* (2013.01); *B60R 2011/0012* (2013.01); *B60R 2011/0078* (2013.01)

(58) Field of Classification Search
CPC ............. B60R 11/00; B60R 2011/0082; B60R 2011/0012; B60R 2011/0078; B60N 2/90; B60N 3/103
See application file for complete search history.

(56) References Cited

U.S. PATENT DOCUMENTS

| | | | | |
|---|---|---|---|---|
| 5,961,356 A * | 10/1999 | Fekete | ................. | G06K 19/077 |
| | | | | 439/700 |
| 6,416,336 B1 * | 7/2002 | Schulte | .................. | A47B 21/06 |
| | | | | 439/131 |
| 6,565,301 B1 * | 5/2003 | Lin | ........................ | B60P 7/0807 |
| | | | | 410/107 |
| 6,969,800 B1 * | 11/2005 | Liao | ........................ | A47B 21/06 |
| | | | | 174/50 |
| 7,183,501 B2 * | 2/2007 | Bowman | .............. | H02G 3/0493 |
| | | | | 174/480 |
| 7,806,723 B2 * | 10/2010 | Chong | ..................... | H02G 3/22 |
| | | | | 439/571 |
| 8,128,045 B2 | 3/2012 | Skaggs | | |
| 8,141,948 B2 | 3/2012 | Cassellia et al. | | |
| 8,226,059 B2 * | 7/2012 | Marshall | ............... | B60N 3/103 |
| | | | | 248/220.21 |
| 8,475,186 B1 * | 7/2013 | Sikkema | ............. | H01R 13/447 |
| | | | | 439/131 |
| 8,540,198 B2 * | 9/2013 | Keyvanloo | .......... | A47F 5/0823 |
| | | | | 248/220.21 |
| 8,827,341 B2 | 9/2014 | Sofield | | |
| 8,993,891 B2 * | 3/2015 | Drane | .................... | H02G 3/185 |
| | | | | 174/152 G |
| 9,312,653 B2 * | 4/2016 | Byrne | .................... | H01R 27/02 |
| 9,601,860 B2 * | 3/2017 | Byrne | .................... | H01R 13/44 |
| 9,651,069 B2 * | 5/2017 | Aspinall | .................. | F16B 2/04 |

(Continued)

*Primary Examiner* — Shin H Kim
(74) *Attorney, Agent, or Firm* — David Coppiellie; Price Heneveld LLP

(57) ABSTRACT

A vehicle includes a surface that has a receptacle. The receptacle includes a perimeter wall that extends in an outward direction from an interior wall to a bezel that engages with the surface. A tab-receiving portion is defined by the perimeter wall. A closeout structure is coupled within the receptacle. The closeout structure is movable between an extended position and a retracted position.

20 Claims, 6 Drawing Sheets

(56) References Cited

U.S. PATENT DOCUMENTS

| | | | |
|---|---|---|---|
| 10,414,500 B2 * | 9/2019 | Irons | B60R 11/0252 |
| 2010/0144198 A1 * | 6/2010 | Marshall | B60N 3/103 |
| | | | 439/577 |
| 2015/0295375 A1 * | 10/2015 | Byrne | H01R 13/44 |
| | | | 439/131 |
| 2016/0167587 A1 | 6/2016 | Dry et al. | |
| 2018/0065567 A1 | 3/2018 | Osterhoff et al. | |
| 2018/0345874 A1 * | 12/2018 | Thain | B60R 11/0241 |
| 2019/0299869 A1 * | 10/2019 | Aguilar Ruelas | H01R 33/97 |

* cited by examiner

VEHICLE RETAINER SOLUTION

FIELD OF THE DISCLOSURE

The present disclosure generally relates to a retainer solution. More specifically, the present disclosure relates to a retainer solution for a vehicle.

BACKGROUND OF THE INVENTION

Vehicles are often provided with a number of storage areas that are accessible to occupants. However, not all vehicles are provided with ample retainer solutions for common occupant needs and desires. Aftermarket solutions may be available in some instances, however, these solutions are often poorly designed, of poor quality, not well-integrated or incorporated into the vehicle, and fall short of expectations due to the generic nature of their design and execution. Accordingly, new and well designed retainer solutions are needed that meet the quality and integration standards set by consumers in the market place.

SUMMARY OF THE INVENTION

According to a first aspect of the present disclosure, a vehicle includes a surface that has a receptacle. The receptacle includes a perimeter wall that extends in an outward direction from an interior wall to a bezel that engages with the surface. A tab-receiving portion is defined by the perimeter wall. A closeout structure is coupled within the receptacle. The closeout structure is movable between an extended position and a retracted position.

Embodiments of the first aspect of the present disclosure can include any one or a combination of the following features:
  the receptacle is configured to receive a retainer solution;
  the retainer solution includes a receptacle engagement portion and a locking tab;
  the locking tab is deployably coupled to the receptacle engagement portion;
  the locking tab is configured to engage with the tab-receiving portion of the receptacle;
  the retainer solution includes a lock release that is configured to actuate the locking tab from an engaged position to a disengaged position;
  the retainer solution includes at least one of a container holder and a device holder;
  the vehicle further includes a resilient member positioned between the interior wall and the closeout structure, wherein the resilient member biases the closeout structure to the extended position;
  the vehicle further includes at least one of a power connector and a data connector provided proximate to the receptacle; and
  the receptacle is positioned in a vehicle seating assembly.

According to a second aspect of the present disclosure, a vehicle seating assembly includes a surface that has a receptacle. The receptacle is configured to receive a retainer solution. The receptacle includes a perimeter wall extending outward from an interior wall to a bezel that engages with the surface, a tab-receiving portion defined by the perimeter wall, and a closeout structure that is coupled within the receptacle and movable between an extended position and a retracted position. The retainer solution includes a receptacle engagement portion and a locking tab.

Embodiments of the second aspect of the present disclosure can include any one or a combination of the following features:
  the locking tab is deployably coupled to the receptacle engagement portion;
  the locking tab is configured to engage with the tab-receiving portion of the receptacle;
  the retainer solution includes a lock release that is configured to actuate the locking tab from an engaged position to a disengaged position;
  the retainer solution includes at least one of a container holder and a device holder; and
  the vehicle seating assembly further includes a resilient member positioned between the interior wall and the closeout structure, wherein the resilient member biases the closeout structure to the extended position.

According to a third aspect of the present disclosure, a vehicle seating assembly includes a surface that has a receptacle that is configured to receive a retainer solution. The receptacle includes an interior wall, a perimeter wall extending outward from the interior wall to a bezel that engages with the surface, and a tab-receiving portion that is defined by the perimeter wall. A closeout structure coupled within the receptacle and movable between an extended position and a retracted position. The retainer solution includes a receptacle engagement portion and a locking tab. The locking tab is deployably coupled to the receptacle engagement portion and is configured to engage with the tab-receiving portion of the receptacle.

Embodiments of the third aspect of the present disclosure can include any one or a combination of the following features:
  the retainer solution includes a lock release that is configured to actuate the locking tab from an engaged position to a disengaged position;
  the retainer solution includes at least one of a container holder and a device holder; and
  the vehicle seating assembly further includes a resilient member positioned between the interior wall and the closeout structure, wherein the resilient member biases the closeout structure to the extended position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
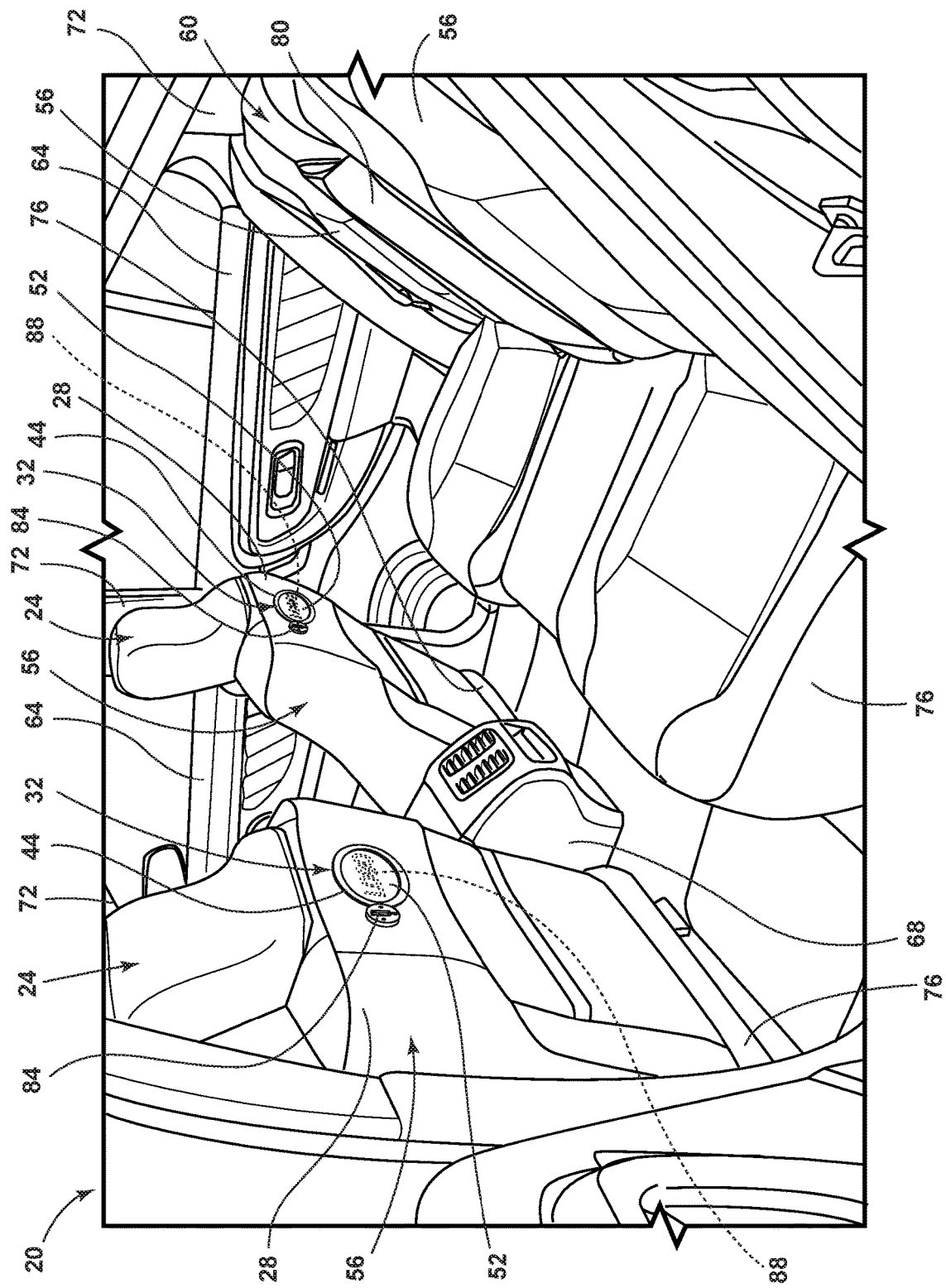
FIG. 1 is a rear perspective view of an interior of a vehicle, illustrating a receptacle for a retainer solution, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle retainer solution. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-6, reference numeral 20 generally designates a vehicle 20. In various examples, the vehicle 20 may be a motor vehicle. For example, the vehicle 20 may be a land vehicle, a water vehicle, an air vehicle, an automobile, a boat, an airplane, and the like. The vehicle 20 is equipped with a vehicle seating assembly 24 that includes a surface 28 that has a receptacle 32. The receptacle 32 includes a perimeter wall 36 that extends in an outward direction from an interior wall 40 to a bezel 44 that engages with the surface 28. A tab-receiving portion 48 is defined by the perimeter wall 36. A closeout structure 52 is coupled within the receptacle 32. The closeout structure 52 is movable between an extended position (FIG. 3A) and a retracted position (FIG. 3B).

Referring again to FIGS. 1 and 2, the receptacle 32 can be positioned at various locations within the vehicle 20. In the depicted example, the receptacle 32 is positioned in a seatback 56 of the vehicle seating assembly 24. More specifically, the receptacle 32 is positioned in the surface 28 of the seatback 56 that is facing a rearward row of seats 60. However, the present disclosure is not limited to such a positioning of the receptacle 32. Additional or alternative non-limiting examples of where the receptacle 32 may be positioned include in a door 64 of the vehicle 20, in a center console 68 of the vehicle 20, in a pillar 72 of the body of the vehicle 20 (e.g., A-pillar, B-pillar, C-pillar, etc.), in a seat 76 of the vehicle seating assembly 24, in the seat 76 of the rearward row of seats 60, in the seatback 56 of the rearward row of seats 60, and/or in a deployable armrest 80 of the rearward row of seats 60. In various examples, a power connector and/or a data connector may be provided in close proximity to one or more of the receptacles 32. In some examples, the power connector and/or data connector may be integrated into a single connector (e.g., a USB connector 84). In alternative examples, the power connector and the data connector can be provided as separate components. In such examples, the power connector may be provided and the data connector excluded, the data connector may be provided and the power connector excluded, or the power and data connectors may both be provided. Additionally, the receptacle 32 provided at a specific location within the vehicle 20 may be provided with the power connector and/or the data connector while other locations within the vehicle 20 that are provided with the receptacle 32 may omit the power connector and/or the data connector. For example, the power connector and/or the data connector may be provided for receptacles 32 that are positioned in areas of the vehicle 20 that lend themselves well to viewing of entertainment devices or electronic devices (e.g., the seatbacks 56 of a front row of seats) while other locations may omit the power connector and/or the data connector (e.g., the door 64). In various examples, the receptacle 32 can be provided with a logo 88, such as brand advertising, personalized logos, and the like. For example, the closeout structure 52 can be provided with the logo 88.

Figure 2:
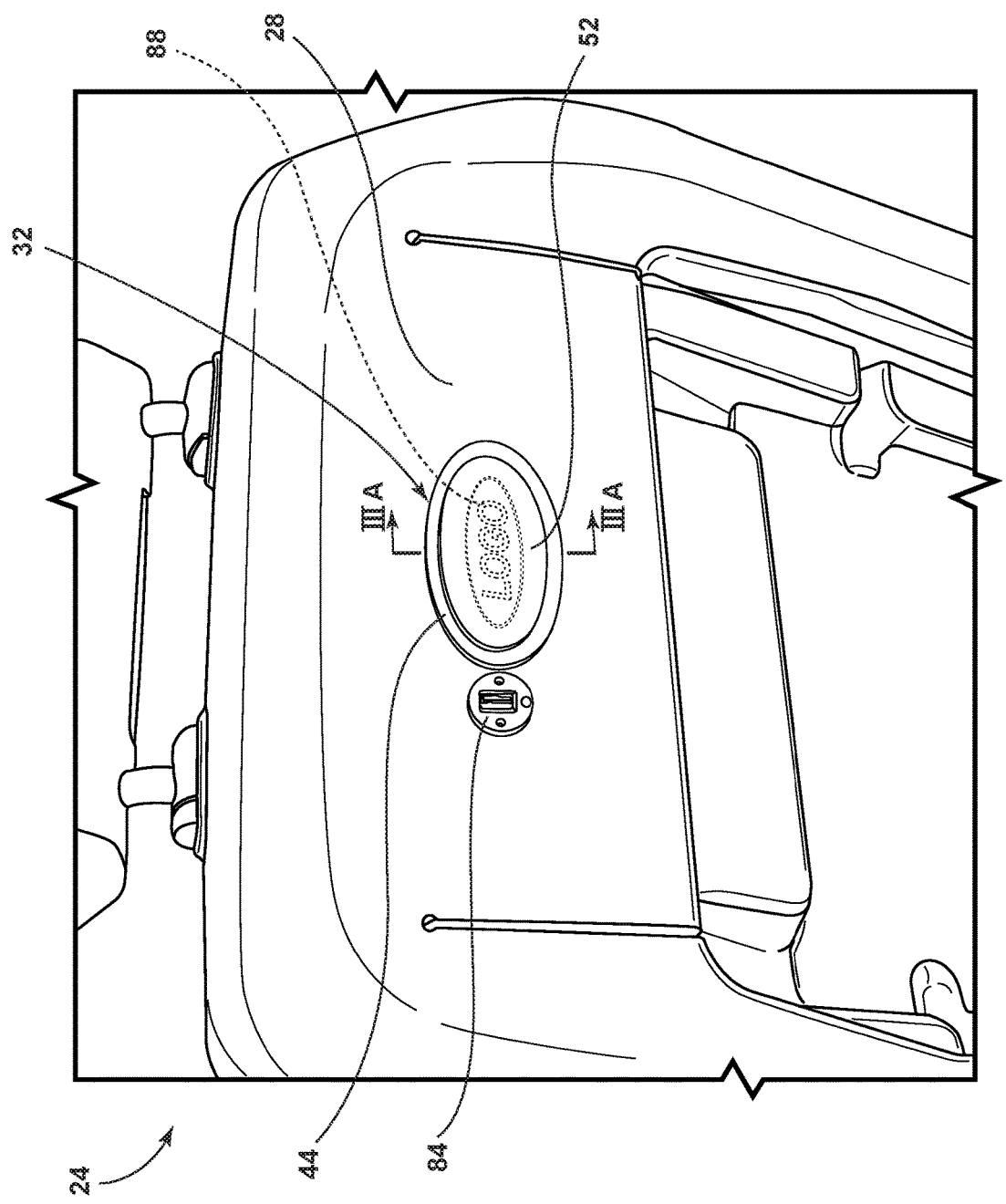
FIG. 2 is a rear perspective view of a vehicle seating assembly equipped with the receptacle, according to one example.

Referring further to FIGS. 1 and 2, the power connector and/or the data connector, such as the USB connector 84, can be provided as a separate component to the receptacle 32. Such an arrangement may be beneficial in preventing wiring associated with the USB connector 84 from becoming entangled with moving components of the receptacle 32, such as the closeout structure 52. However, it is contemplated that the USB connector 84, or any other alternative power and/or data connector, can be provided as an integral component to the receptacle 32. For example, the power and/or data connector can be coupled to the closeout structure 52 and configured to travel with the closeout structure 52 in such a way that entanglement of associated wiring is prevented. In one specific example, a cylinder or post that is hollow may extend between the interior wall 40 and the closeout structure 52 and house wiring that is associated with the power and/or data connectors. In such an example, as the closeout structure 52 moves between the extended position and the retracted position, the cylinder or post that is hollow can pass through an aperture defined by the interior wall 40 at the base of the cylinder or post that is hollow. Accordingly, as the closeout structure 52 traverses a horizontal direction, the cylinder or post that is hollow can pass through the aperture in the interior wall 40 and prevent the wiring associated with the power and/or data connector(s) from directly interacting with movable components of the receptacle 32 in a manner that can result in entanglement. Of course, in such an example the wiring associated with the power and/or data connector(s) terminates at the closeout structure 52 and therefore interacts with a movable component of the receptacle 32; however, such an interaction is unlikely to result in entanglement. In various examples, a take-up assembly may be provide on an inner side of the interior wall 40 that is configured to take-up slack in the wiring associated with the power and/or data connector(s) to further limit the possibility of entanglement. In some examples, a retainer ring may be provided at the base of the cylinder or post that is hollow on one or both ends to prevent the cylinder or post that is hollow from falling behind the interior wall 40 or being ejected through the aperture and dislodged from the receptacle 32. Said another way, the cylinder or post that is hollow can have a generally "T-shaped" or "I-shaped" construction with a cross-member of the construction engaging an inner side of the interior wall 40 and/or engaging with an interior side of the closeout structure 52 such that at extremes of the horizontal travel of the closeout structure 52, the cylinder or post that is hollow remains coupled to the receptacle 32. In various examples, the power and/or data connections may be provided as wireless solutions, such as wireless charging and wireless data transmission (e.g., inductive coupling, Bluetooth connectivity, etc.).

Figure 3A:
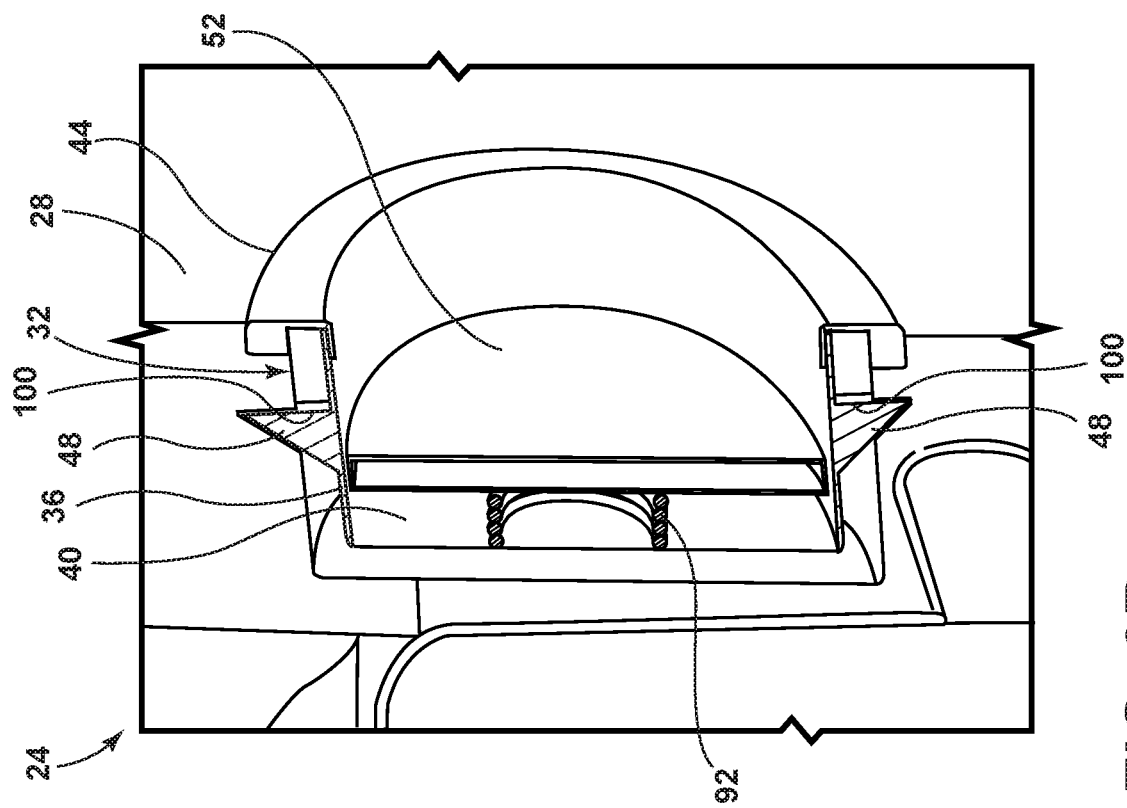
FIG. 3A is a cross-sectional view of the receptacle, taken along line IIIA-IIIA of FIG. 2, illustrating a closeout structure in an extended position, according to one example.
Figure 3B:
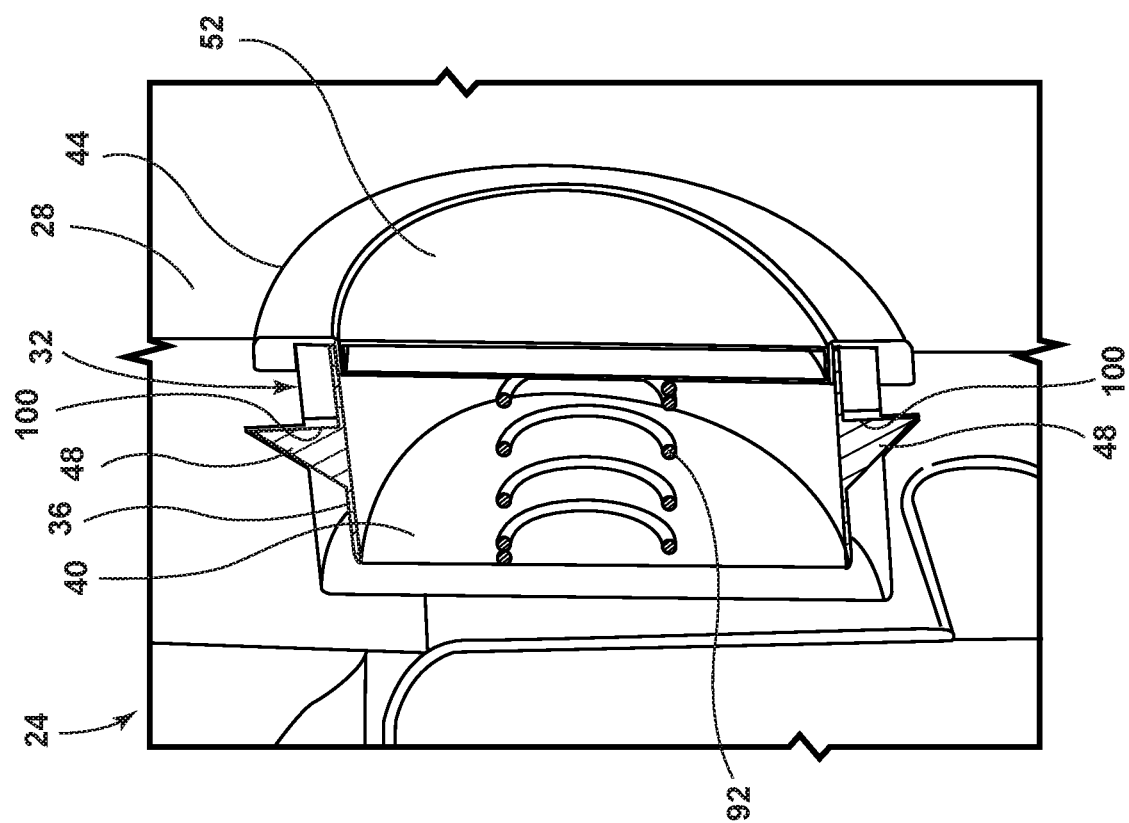
FIG. 3B is a cross-sectional view of the receptacle, taken along line IIIA-IIIA of FIG. 2, illustrating the closeout structure in a retracted position, according to one example.

Referring now to FIGS. 3A and 3B, a resilient member 92 can be positioned between the interior wall 40 and the closeout structure 52. The resilient member 92 can be configured to bias the closeout structure 52 to the extended position (FIG. 3A). In the depicted example, the resilient member 92 is a coil spring. However, the resilient member 92 is not limited to a coil spring, a spring, or even limited to a component that exerts a biasing force by direct contact with the closeout structure 52. For example, the resilient member 92 can be one or more magnets that are arranged in such a way that the magnets repel one another and bias the closeout structure 52 to the extended position. In one specific implementation of such an example, a magnet can be provided on an inner surface (e.g., within the vehicle seating assembly 24) or on an exterior surface (e.g., between the interior wall 40 and the closeout structure 52) of the interior wall 40 and a separate magnet can be provided on an interior side of the closeout structure 52 with like poles of the magnets facing one another to result in a repelling force between the magnets. In various examples, the bezel 44 can serve as a retention member for retaining the closeout structure 52 within the receptacle 32. Therefore, independent of whether a direct coupling or tethering between the interior wall 40, the closeout structure 52, and the resilient member 92 exists, the closeout structure 52 can be prevented from falling out or being ejected from the receptacle 32. In examples, such as that depicted with the coil spring, where the resilient member 92 is directly coupled or fastened to the interior wall 40 and the closeout structure 52, it is not necessary for the bezel 44 to act as a retention member. However, the bezel 44 may nonetheless serve the purpose of a retention member to further ensure the closeout structure 52 remains coupled within the receptacle 32. In some examples, such as the depicted example, the closeout structure 52 can be generally hollow such that an overall weight of the closeout structure 52 is reduced. Alternatively, the closeout structure 52 can be a generally solid or continuous piece of material.

Referring again to FIGS. 3A and 3B, the perimeter wall 36 extends in an outward direction from the interior wall 40 toward the surface 28 and/or the bezel 44. The tab-receiving portion 48 is defined by the perimeter wall 36. One or more of the tab-receiving portions 48 can be provided within the receptacle 32. The tab-receiving portion 48 is configured to retain a retainer solution 96 (see FIGS. 5 and 6) that can be removably coupled to the receptacle 32. Accordingly, it may be beneficial for the tab-receiving portion 48 to include a bearing surface 100 that is configured to retain the retainer solution 96 within the receptacle 32 once the retainer solution 96 has been coupled to the receptacle 32. In some examples, the bearing surface 100 can extend in a generally perpendicular direction from the perimeter wall 36 in a radially outward direction. In general, the tab-receiving portion 48 is complementary in shape to a locking tab 104 (FIG. 4) on the retainer solution 96 that is configured to engage with the tab-receiving portion 48 to retain the retainer solution 96 within the receptacle 32. The bearing surface 100 is configured to retain the retainer solution 96 within the receptacle 32 when the weight of the retainer solution 96 alone or under load is being exerted on the tab-receiving portion 48. Accordingly, the bearing surface 100 need not extend from the perimeter wall 36 in a generally perpendicular fashion, as shown in the depicted example, so long as the bearing surface 100 is capable of supporting the weight of the retainer solution 96 alone or under load without resulting in a decoupling of the retainer solution 96 from the receptacle 32. In various examples, the resilient member 92 provides continuous outward pressure to the closeout structure 52 such that, when the retainer solution 96 is engaged with the receptacle 32, the closeout structure 52 actively engages with the retainer solution 96 to actively press the locking tab 104 against the bearing surface 100. Therefore, the retainer solution 96 is prevented from rattling, buzzing, or generally moving around while the retainer solution 96 is engaged with the receptacle 32. Accordingly, the user is provided with a well-integrated and tight-fitting assembly that prevents excessive unintended movement of items supported by the retainer solution 96.

Figure 4:
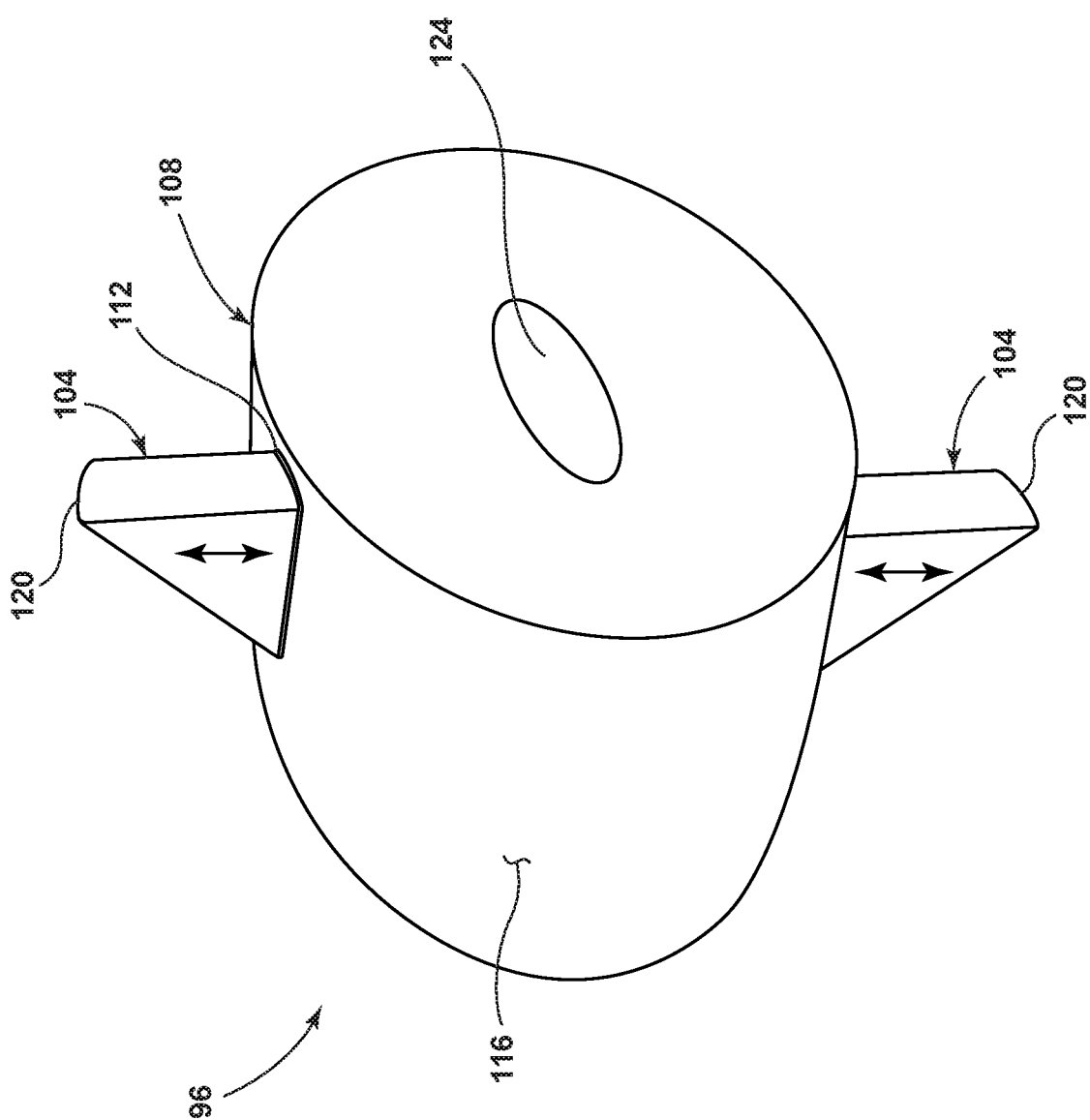
FIG. 4 is side perspective view of a portion of the retainer solution that engages with the receptacle, illustrating locking tabs, according to one example.

Referring to FIGS. 3A-4, a portion of the retainer solution 96 is shown that interacts with the receptacle 32. The retainer solution 96 includes a receptacle engagement portion 108 and the locking tab 104. The receptacle engagement portion 108 can be provided with a plurality of the locking tabs 104 and it may be beneficial for the locking tabs 104 to be spaced equidistant about the receptacle engagement portion 108. In various examples, the locking tabs 104 can be deployably coupled or resiliently coupled to the receptacle engagement portion 108. Accordingly, the locking tabs 104 can be compressed by the perimeter wall 36 as the retainer solution 96 is inserted into the receptacle 32 and once the locking tabs 104 are in proximity to the tab-receiving portions 48, the locking tabs 104 can extend radially outward to actively engage with the tab-receiving portions 48. Alternatively, once the retainer solution 96 is positioned within the receptacle 32, the locking tabs 104 can be deployed to engage with the tab-receiving portions 48. The locking tabs 104 can be positioned within a slot 112 that is defined by an outer surface 116 of the receptacle engagement portion 108. When the locking tabs 104 are in a lowered position, an outermost point 120 of the locking tab 104 may be proximate the outer surface 116 of the receptacle engagement portion 108. In various examples, the retainer solution 96 includes a lock release 124 that is configured to actuate the locking tab 104 from an engaged position to a disengaged position, which may also be referred to as a raised position and a lowered position, respectively. The lock release 124 can be positioned directly on the retainer solution 96 (e.g., on the receptacle engagement portion 108). Alternatively, the lock release 124 can be positioned in a support structure to which the receptacle 32 is coupled (e.g., the vehicle seating assembly 24). For example, the lock release 124 can be positioned within the vehicle seating assembly 24 and remotely couple to the tab-receiving portions 48 such that the locking tabs 104 can be compressed or otherwise ejected from the tab-receiving portions 48 to enable removal of the retainer solution 96 from the receptacle 32.

Figure 5:
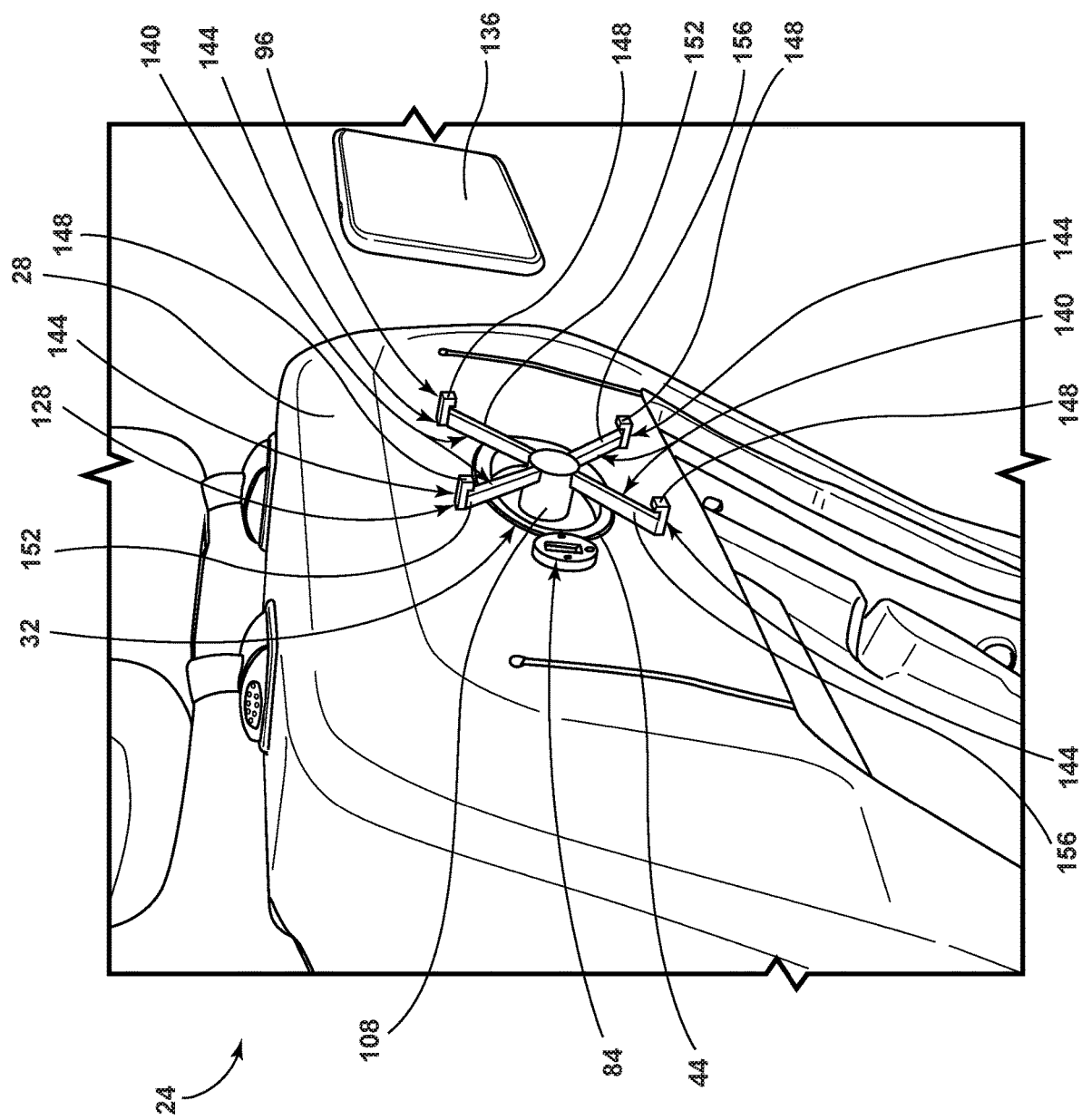
FIG. 5 is a rear perspective view of the retainer solution engaged with the receptacle, according to one example.
Figure 6:
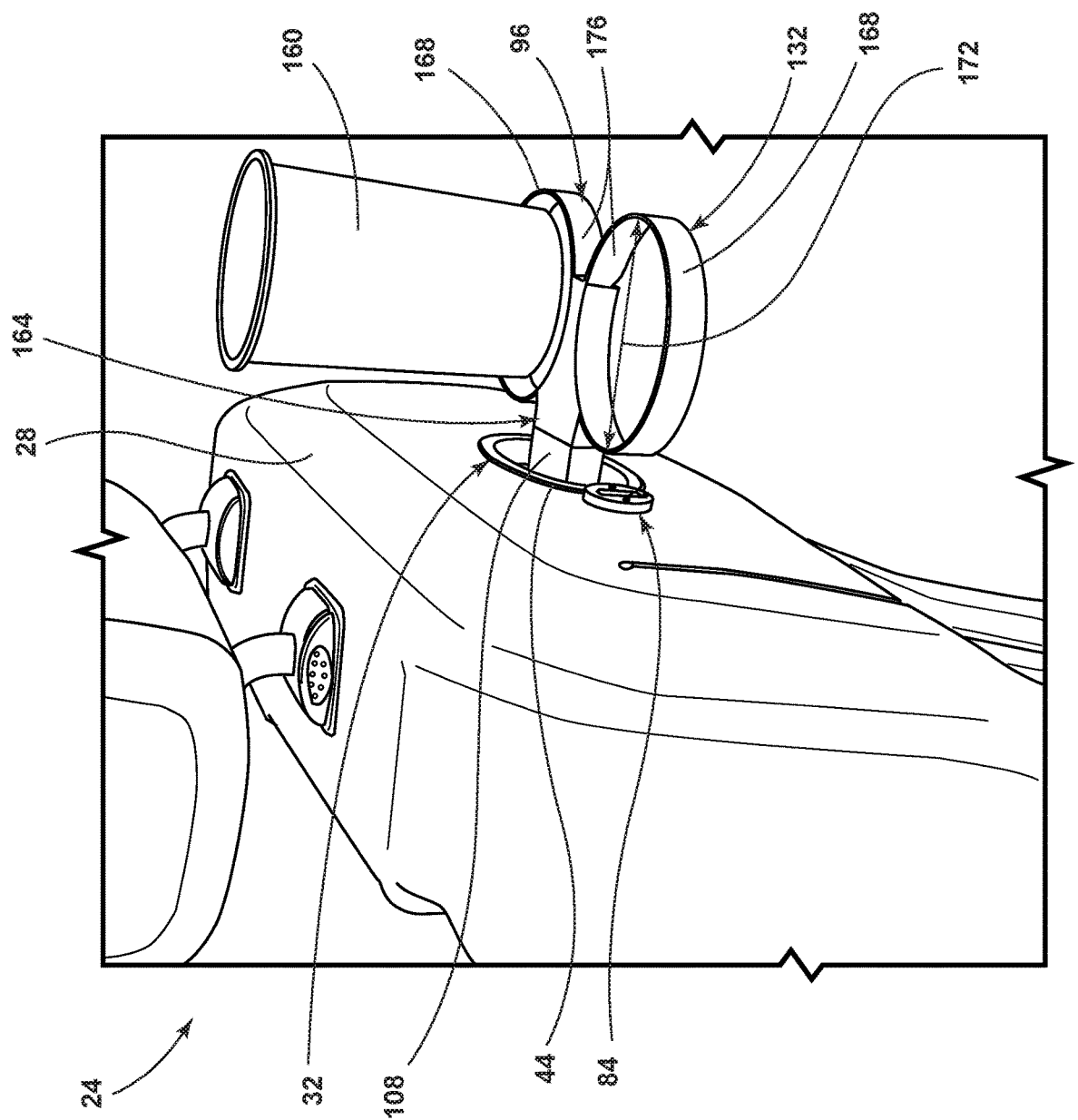
FIG. 6 is a rear perspective view of the retainer solution engaged with the receptacle, according to another example.

Referring now to FIGS. 5 and 6, the retainer solution 96 can be one or more of a number of utility enhancing structures that add to the overall experience for an occupant of the vehicle 20. For example, the retainer solution 96 can be a device holder 128 (e.g., such as an electronic device holder), a container holder 132 (e.g., beverage container holder), a light source assembly, a headrest or pillow assembly, a working surface, and the like. Accordingly, while referred to as a retainer solution, the retainer solution 96 can be more generally referred to as a utility solution that is not limited to a specific example. Rather, the present disclosure provides a multi-use interface (e.g., receptacle 32) that is configured to enable enhanced utility to the interior of the vehicle 20 by providing an interface that can receive a standardized base (e.g., receptacle engagement portion 108) that supports one or more of a plurality of utility enhancing solutions. As described above, the receptacle 32 can be accompanied by a power connector and/or a data connector, such as the USB connector 84.

With specific reference to the example depicted in FIG. 5, the device holder 128 can be configured to selectively support and/or retain an electronic device 136 (e.g., smartphone, tablet, e-reader, handheld entertainment device, gaming system, etc.). The device holder 128 can be provided with a plurality of arms 140 that extend radially outward from the receptacle engagement portion 108. The plurality of arms 140 can each terminate at an outermost end with a horizontal protrusion 144 that extends in a generally horizontal direction from the arm 140 such that the horizontal protrusion 144 and the arm 140 are in a generally perpendicular relationship with one another. The horizontal protrusions 144 may be provided with a vertical tab 148 that extends radially inward from the horizontal protrusion 144 at an end of the horizontal protrusion 144 that is opposite the arm 140. The horizontal protrusions 144 and/or the vertical tabs 148 engage with the electronic device 136 when the electronic device 136 is coupled to the device holder 128 to retain the electronic device 136 to the device holder 128 in vertical and horizontal directions, respectively. Said another way, the horizontal protrusions 144 retain the electronic device 136 in a vertical direction due to the horizontal protrusions 144 being in a non-parallel relationship with the vertical plane. Similarly, the vertical tabs 148 retain the electronic device 136 in a horizontal direction due to the vertical tabs 148 being in a non-parallel relationship with the horizontal plane. Accordingly, the electronic device 136 is prevented from becoming unintentionally dislodged or decoupled from the device holder 128 (e.g., during vehicle maneuvers, during vehicle impact events, due to incidental contact by occupants, etc.). In various examples, the arms 140 can be movably coupled to the receptacle engagement portion 108. For example, the arms 140 can be lengthened and/or shortened in a radial direction to accommodate electronic devices 136 of varying sizes and shapes. Additionally or alternatively, the arms 140 can be movable about a circumference of the receptacle engagement portion 108 such that an angular displacement between the individual arms 140 can be varied to accommodate electronic devices 136 of varying sizes and shapes. In one specific example, the lengthening and/or shortening of the arms 140 can be accomplished by the arms 140 that are parallel with one another being slightly varied in size. In such an example, a first arm 152 and a second arm 156 of a parallel pair of arms 140 may be slightly varied in size such that the first arm 152 can receive the second arm 156 within the dimensions of the first arm 152 as the arms 140 are shortened. Similarly, when the arms 140 are lengthened, the additional length of the second arm 156 that is stored or nested within the first arm 152 can extend from the first arm 152, through the receptacle engagement portion 108 and ultimate radially outward from the receptacle engagement portion 108. It may be beneficial for adjustments of the arms 140, regardless of the direction of adjustment, to be executed along a series of detents or interference positions such that the arms 140 can be at least temporarily locked or retained in their desired locations for holding the electronic device 136.

With specific reference to the example depicted in FIG. 6, the container holder 132 can be configured to support one or more beverage containers 160. The container holder 132 can include a base 164 that extends from, or is integrally formed with, the receptacle engagement portion 108. One or more container rings 168 may be provided at an end of the base 164 that is opposite to the receptacle engagement portion 108. The container rings 168 can be provided with the ability to adjust an inner diameter 172 of the container ring 168 to accommodate beverage containers 160 of various sizes. The adjustability of the inner diameter 172 of the container rings 168 can be accomplished by pushing a free end 176 of the container ring 168 into the base 164 or pulling on the free end 176 of the container ring 168 to extend the container ring 168 out of the base 164. The base 164 of the container holder 132 can be provided with detents or a ratcheting assembly that can retain the container ring 168 in a desired position to maintain the inner diameter 172 of the container ring 168 at the desired size. In some examples, the container holder 132 can be provided with heating and cooling functionality to maintain the contents of the beverage container 160 within a desired temperature range. Such temperature control can be accomplished, in one non-limiting example, by a thermoelectric device (e.g., a Peltier device).

Vehicles 20 are often provided with a number of storage areas that are accessible to occupants. However, not all vehicles 20 are provided with ample retainer solutions for common occupant needs and desires. Aftermarket solutions may be available in some instances, however, these solutions are often poorly designed, of poor quality, not well-integrated or incorporated into the vehicle 20, and fall short of expectations due to the generic nature of their design and execution. Accordingly, the present disclosure provides a well-integrated receptacle 32 that is configured to receive a variety of retainer solutions 96. Providing a common attachment architecture for the retainer solutions 96 enables the customization of the interior of the vehicle 20 to the particular needs and desires of a given occupant.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   a surface having a receptacle, the receptacle comprising:
      a perimeter wall extending outward from an interior wall to a bezel that engages with the surface;
      a tab-receiving portion defined by the perimeter wall; and
      a closeout structure coupled within the receptacle and movable between an extended position and a retracted position.

2. The vehicle of claim 1, wherein the receptacle is configured to receive a retainer solution.

3. The vehicle of claim 2, wherein the retainer solution comprises:
   a receptacle engagement portion; and
   a locking tab.

4. The vehicle of claim 3, wherein the locking tab is deployably coupled to the receptacle engagement portion.

5. The vehicle of claim 3, wherein the locking tab is configured to engage with the tab-receiving portion of the receptacle.

6. The vehicle of claim 5, wherein the retainer solution further comprises:
   a lock release that is configured to actuate the locking tab from an engaged position to a disengaged position.

7. The vehicle of claim 2, wherein the retainer solution comprises at least one of a container holder and a device holder.

8. The vehicle of claim 1, further comprising:
   a resilient member positioned between the interior wall and the closeout structure, wherein the resilient member biases the closeout structure to the extended position.

9. The vehicle of claim 1, further comprising:
   at least one of a power connector and a data connector provided proximate to the receptacle.

10. The vehicle of claim 1, wherein the receptacle is positioned in a vehicle seating assembly.

11. A vehicle seating assembly, comprising:
   a surface having a receptacle configured to receive a retainer solution, the receptacle comprising:
      a perimeter wall extending outward from an interior wall to a bezel that engages with the surface;
      a tab-receiving portion defined by the perimeter wall;

a closeout structure coupled within the receptacle and movable between an extended position and a retracted position; and the retainer solution comprising:

a receptacle engagement portion and a locking tab.

12. The vehicle seating assembly of claim 11, wherein the locking tab is deployably coupled to the receptacle engagement portion.

13. The vehicle seating assembly of claim 11, wherein the locking tab is configured to engage with the tab-receiving portion of the receptacle.

14. The vehicle seating assembly of claim 11, wherein the retainer solution further comprises:

a lock release that is configured to actuate the locking tab from an engaged position to a disengaged position.

15. The vehicle seating assembly of claim 11, wherein the retainer solution comprises at least one of a container holder and a device holder.

16. The vehicle seating assembly of claim 11, further comprising:

a resilient member positioned between the interior wall and the closeout structure, wherein the resilient member biases the closeout structure to the extended position.

17. A vehicle seating assembly, comprising:

a surface having a receptacle configured to receive a retainer solution, the receptacle comprising:

an interior wall;

a perimeter wall extending outward from the interior wall to a bezel that engages with the surface;

a tab-receiving portion defined by the perimeter wall; and a closeout structure coupled within the receptacle and movable between an extended position and a retracted position;

the retainer solution comprising:

a receptacle engagement portion; and a locking tab deployably coupled to the receptacle engagement portion and configured to engage with the tab-receiving portion of the receptacle.

18. The vehicle seating assembly of claim 17, wherein the retainer solution further comprises:

a lock release that is configured to actuate the locking tab from an engaged position to a disengaged position.

19. The vehicle seating assembly of claim 17, wherein the retainer solution comprises at least one of a container holder and a device holder.

20. The vehicle seating assembly of claim 17, further comprising:

a resilient member positioned between the interior wall and the closeout structure, wherein the resilient member biases the closeout structure to the extended position.

* * * * *